(12) United States Patent
Noh (10) Patent No.: US 12,481,026 B2
(45) Date of Patent: Nov. 25, 2025

(54) METHOD FOR EXTRACTING OUTLINE OF OBJECT IN VEHICLE AND VEHICLE THEREOF

(71) Applicants: HYUNDAI MOTOR COMPANY, Seoul (KR); KIA CORPORATION, Seoul (KR)

(72) Inventor: Mi Rim Noh, Jeonju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 408 days.

(21) Appl. No.: 18/107,120

(22) Filed: Feb. 8, 2023

(65) Prior Publication Data
US 2024/0019545 A1 Jan. 18, 2024

(30) Foreign Application Priority Data
Jul. 14, 2022 (KR) .................. 10-2022-0087062

(51) Int. Cl.
*G01S 7/48* (2006.01)
*G01S 17/89* (2020.01)
*G01S 17/931* (2020.01)

(52) U.S. Cl.
CPC ............ *G01S 7/4802* (2013.01); *G01S 17/89* (2013.01); *G01S 17/931* (2020.01)

(58) Field of Classification Search
CPC ...... G01S 7/4802; G01S 17/89; G01S 17/931; G01S 17/50; G06V 20/56; G06V 10/20; G06T 7/13; G06T 7/70
See application file for complete search history.

(56) References Cited

U.S. PATENT DOCUMENTS

| 2002/0134151 A1 | 9/2002 | Naruoka et al. | |
| 2018/0374238 A1* | 12/2018 | Park | ............. G06T 3/153 |
| 2021/0312633 A1* | 10/2021 | Noh | ............. G06T 7/12 |

(Continued)

FOREIGN PATENT DOCUMENTS

| CN | 109636821 | * | 4/2019 | ............. G06T 7/13 |
| CN | 109684921 A | | 4/2019 | |
| CN | 111325138 A | | 6/2020 | |

(Continued)

OTHER PUBLICATIONS

David Wittmann et al, "Improving Lidar Data Evaluation for Object Detection and Tracking Using a Priori Knowledge and Sensor fusion", Proceedings of the 11th International Conference on Informatics in Control, Automation and Robotics (ICINCO-2014), pp. 794-801.*

*Primary Examiner* — Alexander Satanovsky
(74) *Attorney, Agent, or Firm* — Morgan Lewis & Bockius LLP (57) ABSTRACT

An object outline extracting method for a vehicle includes: detecting distributed positions of points in global quadrants generated based on a subject vehicle, as light detection and ranging (LiDAR) data is received; analyzing the distributed positions of the points and determining whether the points are distributed in a preset area based on a result value obtained from the analyzing; when it is determined that the points are distributed in the preset area, resetting a reference boundary of the global quadrants; and generating an object contour by connecting points found based on the reset reference boundary.

20 Claims, 10 Drawing Sheets

(56) References Cited

U.S. PATENT DOCUMENTS

2022/0229186 A1\* 7/2022 Lee .................. G01S 7/4817

FOREIGN PATENT DOCUMENTS

| JP | 4736777 | B2 | | 7/2011 | | |
|----|---------|----|----|--------|----|----|
| JP | 4811201 | B2 | | 11/2011 | | |
| JP | 2020056657 | | \* | 4/2020 | ............... | G01C 7/04 |
| KR | 10-2114558 | B1 | | 5/2020 | | |
| KR | 20200047743 | | \* | 5/2020 | ............... | G06T 7/80 |
| KR | 10-2275671 | B1 | | 7/2021 | | |

\* cited by examiner

METHOD FOR EXTRACTING OUTLINE OF OBJECT IN VEHICLE AND VEHICLE THEREOF

CROSS-REFERENCE TO RELATED APPLICATION

The present application claims priority to Korean Patent Application No. 10-2022-0087062, filed on Jul. 14, 2022, the entire contents of which is incorporated herein for all purposes by this reference.

BACKGROUND OF THE PRESENT DISCLOSURE

Field of the Present Disclosure

The present disclosure relates to an object outline extracting method for a vehicle, and a vehicle thereof.

Description of Related Art

Light detection and ranging (LiDAR) has been developed to construct and visualize geographic data for constructing three-dimensional (3D) geographic information system (GIS) information. A LiDAR system may estimate a position of a subject vehicle using a point cloud obtained through a LiDAR sensor and obtain information related to objects around the vehicle to assist in a driving function.

When information related to an object recognized using the LiDAR sensor is inaccurate, the reliability of autonomous driving may be degraded, threatening the safety of the driver. Accordingly, research has been ongoing to increase the accuracy of object detection.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an object outline extracting method for a vehicle and a vehicle thereof which may more accurately recognize a shape of an object without an occurrence of unnecessarily continuous segments by varying a reference for a plurality of boundary quadrants based on a position of an extracted object, and may thereby reduce an error in map matching.

Additional aspects, advantages, and features of the present disclosure will be set forth in part in the description which follows and in part will become apparent to those having ordinary skill in the art upon examination of the following or may be learned from practice of the present disclosure. The aspect and other advantages of the present disclosure may be realized and attained by the structure particularly pointed out in the written description and claims hereof as well as the appended drawings.

To achieve the aspect described above, various exemplary embodiments of the present disclosure are provided herein. According to an exemplary embodiment of the present disclosure, there is provided an object outline extracting method for a vehicle, including: detecting distributed positions of points in global quadrants generated based on a subject vehicle, as light detection and ranging (LiDAR) data is received; analyzing the distributed positions of the points, and determining whether the points are distributed in a preset area based on a result value obtained from the analyzing; when it is determined that the points are distributed in the preset area, resetting a reference boundary of the global quadrants; and generating an object contour by connecting points found based on the reset reference boundary.

According to another exemplary embodiment of the present disclosure, there is provided a vehicle including: a LiDAR sensor; and an object tracking device configured to receive LiDAR data from the LiDAR sensor. The object tracking device is configured to: detect distributed positions of points in global quadrants generated based on the vehicle, as the LiDAR data is received from the LiDAR sensor; analyze the distributed positions of the points, and determine whether the points are distributed in a preset area based on a result value obtained from the analyzing; when it is determined that the points are distributed in the preset area, reset a reference boundary of the global quadrants; and generate an object contour by connecting points found based on the reset reference boundary.

According to the example embodiments described herein, an object outline extracting method for a vehicle and a vehicle thereof may vary a reference for a plurality of boundary quadrants based on a position of an extracted object and may thereby prevent unnecessarily continuous segments from occurring, and may thus increase the accuracy in recognizing a shape of an object.

Furthermore, the object outline extracting method and the vehicle may vary a reference for a plurality of boundary quadrants based on a position of an extracted object and may thereby prevent unnecessarily continuous segments from occurring, and may thus more accurately recognize a shape of an object and reduce an error in map matching.

Other objects, features, and aspects will be apparent from the following detailed description, the drawings, and the claims.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings, and the same or similar elements will be provided the same reference numerals regardless of reference symbols, and a redundant description thereof will be omitted. In the following description, the terms "module" and "unit" for referring to elements are assigned and used interchangeably in consideration of convenience of explanation, and thus the terms per se do not necessarily have different meanings or functions. Furthermore, in describing the exemplary embodiments included in the present specification, when it is determined that a detailed description of related publicly known technology may obscure the gist of the exemplary embodiments included in the present specification, the detailed description thereof will be omitted. The accompanying drawings are used to help easily explain various technical features, and it may be understood that the exemplary embodiments presented herein are not limited by the accompanying drawings. Accordingly, the present disclosure should be construed to extend to any alterations, equivalents, and substitutes in addition to those which are set out in the accompanying drawings.

When an element is referred to as being "coupled" or "connected" to another element, the element may be directly coupled or connected to the other element. However, it should also be understood that another element may be present therebetween. In contrast, when an element is referred to as being "directly coupled" or "directly connected" to another element, it should be understood that there are no other elements therebetween.

In the present specification, it should be understood that a term such as "include" or "have" is directed to designate the presence of features, numbers, steps, operations, elements, parts, or combinations thereof described in the specification, and does not preclude the possibility of addition or presence of one or more other features, numbers, steps, operations, elements, parts, or combinations thereof.

Although terms including ordinal numbers, such as "first," "second," etc., may be used herein to describe various elements, the elements are not limited by these terms. These terms are generally used to distinguish one element from another.

A singular expression includes the plural form unless the context clearly dictates otherwise.

Hereinafter, example embodiments will be described in detail with reference to the accompanying drawings. However, various alterations and modifications may be made to the embodiments. Here, the exemplary embodiments are not construed as limited to the present disclosure and should be understood to include all changes, equivalents, and replacements within the idea and the technical scope of the present disclosure.

The present disclosure relates to a technology for varying a reference for a plurality of boundary quadrants based on a position of an extracted object and more accurately recognizing a shape of an object without an occurrence of unnecessarily continuous segments.

Accordingly, the present disclosure provides a technology for extracting a highly reliable outline corresponding to a shape of an object.

Generally, to extract a nearby object (e.g., a nearby object outline) around a vehicle, a sorting algorithm and a convex hull algorithm may be used. These algorithms may include setting a center portion of the front bumper of the vehicle as an origin point of a coordinate system, extracting an outline of the nearby object around the vehicle, and identifying the nearby object around the vehicle. Such an existing method may, however, have its limitation in extracting an outline which is a shape of an object.

To solve such a limitation, the present disclosure provides a technology for analyzing points distributed in global quadrants and resetting a reference boundary for a search order based on a result value from the analysis to more accurately extract an outline which is a shape of an object, which may thereby overcome a limitation an existing convex hull has.

Hereinafter, the operational principle and embodiments of the present disclosure will be described with reference to the accompanying drawings.

Figure 1:
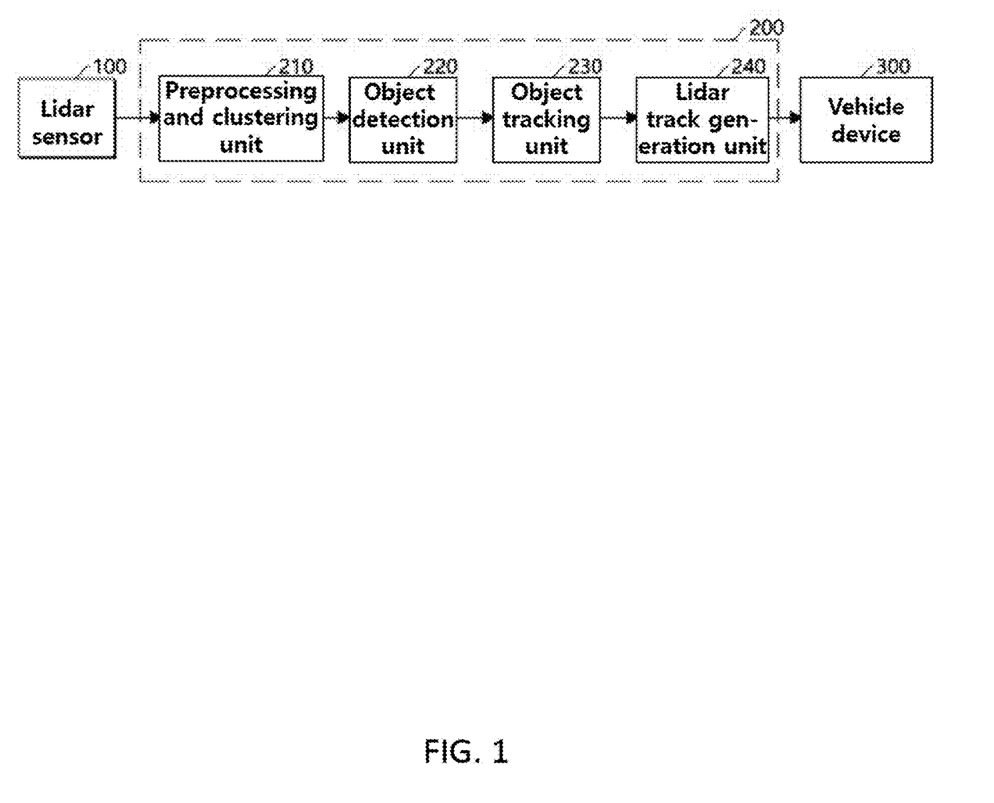
FIG. 1 is a schematic block diagram illustrating an example of a light detection and ranging (LiDAR) system for a vehicle according to an exemplary embodiment of the present disclosure.

FIG. 1 is a schematic block diagram illustrating an example of a light detection and ranging (LiDAR) system for a vehicle according to an exemplary embodiment of the present disclosure.

Referring to FIG. 1, a LiDAR system for a vehicle according to various exemplary embodiments of the present disclosure may include a LiDAR sensor 100, an object tracking device 200 configured to process data obtained from the LiDAR sensor 100 and output object tracking information obtained by tracking a nearby object, and a vehicle device 300 configured to control various functions of the vehicle according to the object tracking information output from the object tracking device 200.

The LiDAR sensor 100 may emit a laser pulse to an object and then measure a time at which the laser pulse reflected from the object within a measurement range returns, and may thereby detect information, such as, for example, a distance to the object, a direction of the object, a speed, and the like. The object described herein may refer to another vehicle, person, thing, or the like which is present outside the vehicle, for example.

The LiDAR sensor 100 may output a detecting result as LiDAR data. The LiDAR data may be output in a form of point cloud data including a plurality of points for a single object.

The object tracking device 200 may include at least one processor configured to receive the LiDAR data from the LiDAR sensor 100 to determine the presence or absence of an object of interest, recognize a shape of the object to track the object, and classify a type of the recognized object.

The object tracking device 200 may extract cluster points using the LiDAR data, and may reset or change the reference boundary for the search order in response to distributed positions of the extracted cluster points. As an exemplary embodiment of the present disclosure, the search order may be defined as a CW rotational order starting from the reference boundary. The cluster points described herein may refer to points included in a cluster. The points are connected in the search order to form a contour of the object, and the object tracking device 200 may obtain a contour which may fit better to the outline of the object by changing the reference boundary of the global quadrants based on the distributed positions of the cluster points. Accordingly, the object tracking device 200 may more accurately recognize the shape of the object.

The origin point of the global quadrants may be set as a center point of a front bumper of a subject vehicle (simply referred to herein as a "vehicle"). The global quadrants include four boundaries one of which may be set by default as the reference boundary for the search order. For example, as will be detailed below, the reference boundary may be set by default to be the first boundary which is 360° to 0° with respect to a longitudinal axis from the vehicle, the axis directing the same direction as the heading of the vehicle. The global quadrants may also be referred to herein as a global coordinate system.

The object tracking device 200 may recognize the shape of the object by searching for the cluster points in a clockwise (CW) direction starting from the reference boundary and generating a contour of the object. This will be further described below.

The object tracking device 200 may include a preprocessing and clustering unit 210, an object detection unit 220, an object tracking unit 230, and a LiDAR track generation unit 240.

The preprocessing and clustering unit 210 may preprocess the LiDAR data received from the LiDAR sensor 100 into a processable form, and then cluster the LiDAR data into significant shape units.

The preprocessing and clustering unit 210 may perform a preprocessing process to remove points with a relatively low intensity or reflectance through filtering based on intensity or confidence information of the LiDAR data and transform the LiDAR data to fit in the global quadrants.

The preprocessing and clustering unit 210 may group the LiDAR data into the significant units according to a predetermined rule, and generate a cluster which is a result of the grouping. Clustering used herein may refer to a process of generating each cluster by grouping points estimated as being obtained from the same object.

The object detection unit 220 may determine the shape of the object based on the contour generated by use of the cluster points. The object detection unit 220 may use some representative cluster points among the whole cluster points for the contour of the object. To the present end, the object detection unit 220 may extract the representative cluster points. The object detection unit 220 may reset or change the reference boundary of the global quadrants based on distributed positions of the extracted cluster points. That is, the object detection unit 220 may more accurately recognize the shape of the object by changing the reference boundary according to the distributed positions of the cluster points. The global quadrants may be set with a point of the vehicle as an origin point, and include a first quadrant (indicated as ①), a second quadrant (②), a third quadrant (③), and a fourth quadrant (④), which will be described below.

Furthermore, the object detection unit 220 may detect a box fit to the shape of the object and then generate information related to the box including the width, length, position, or heading of the box.

The object tracking unit 230 may select a box associated with the object being tracked based on box information related to a plurality of boxes output from the object detection unit 220. The term "associated" or "association" used herein may refer to a process of selecting a box to be used to maintain tracking of a target object currently being tracked, from box information related to a plurality of boxes.

The LiDAR track generation unit 240 may generate a track along a target object based on associated boxes and output the generated track to the vehicle device 300.

The vehicle device 300 may receive a LiDAR track for each channel from the object tracking device 200 and apply the received LiDAR track to control the vehicle.

Furthermore, although not shown, the vehicle device 300 may include a memory. The memory may store therein various pieces of data used in at least one device of the vehicle device 300, for example, a software program and input data and/or output data for commands related thereto.

For example, the memory may store a software program for extracting an object contour based on LiDAR data obtained from the LiDAR sensor 100.

The memory may also store a convex hull algorithm used to extract an object contour. The convex hull algorithm is an existing technique Generally, and thus a more detailed description thereof will be omitted here for conciseness. The memory may include a nonvolatile memory such as a cache, a read-only memory (ROM), a programmable ROM (PROM), an erasable PROM (EPROM), an electrically EPROM (EEPROM), and/or a flash memory, and/or a volatile memory such as a random-access memory (RAM).

Figure 2:
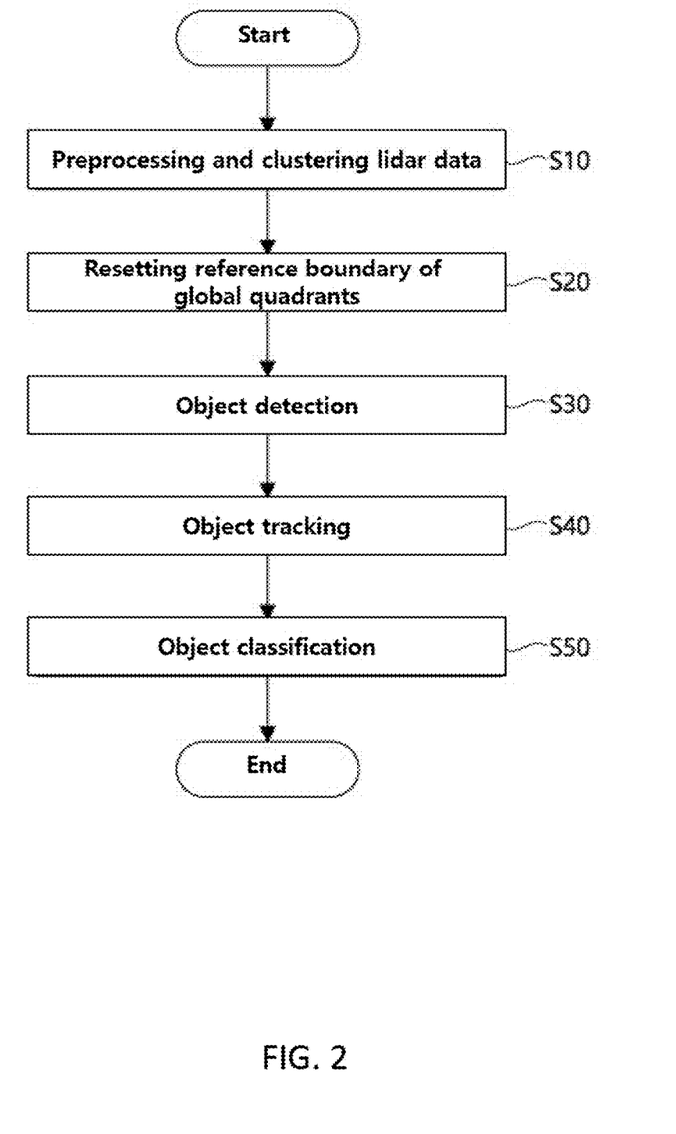
FIG. 2 is a flowchart illustrating an example of an object outline extracting method using an object tracking device of FIG. 1.
Figure 3:
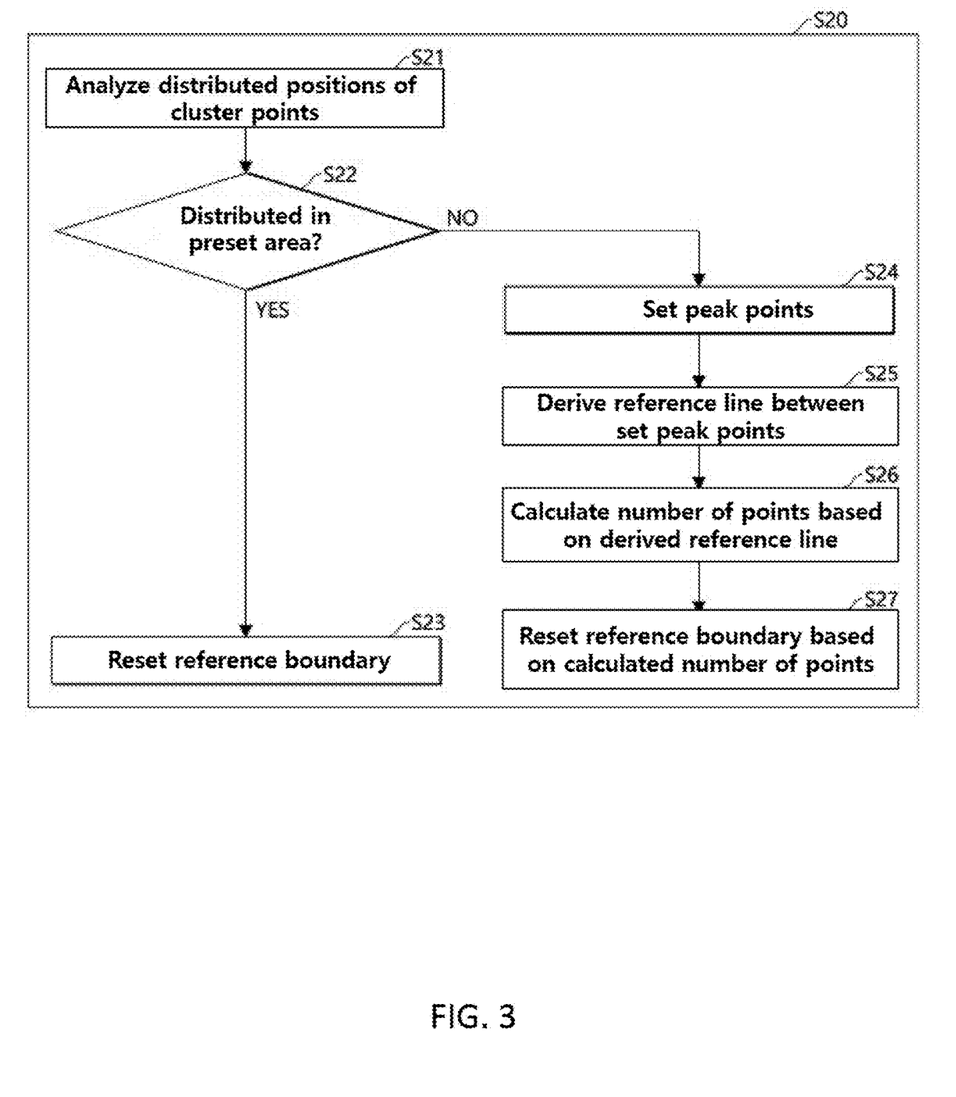
FIG. 3 is a flowchart illustrating an example of setting a reference boundary of global quadrants of FIG. 2.

FIG. 2 is a flowchart illustrating an example of an object outline extracting method using an object tracking device of FIG. 1. FIG. 3 is a flowchart illustrating an example of setting a reference boundary of FIG. 2.

Referring to FIG. 2 and FIG. 3, in step S10, the object tracking device 200 may preprocess LiDAR data in a form of a point cloud received from the LiDAR sensor 100 into a processable form and perform clustering the preprocessed LiDAR data.

The preprocessing and clustering unit 210 may perform a preprocessing process of removing ground data from the LiDAR data, and perform clustering to group the preprocessed LiDAR data into significant shape units, that is, point units each corresponding to a portion considered to be the same object.

In step S20, the object detection unit 220 may reset the reference boundary of the global quadrants based on distributed positions of representative cluster points, and thus obtain a new reset reference boundary. The object detection unit 220 may extract representative the cluster points from the whole cluster points, and change or reset the reference boundary based on the distributed positions of the extracted cluster points.

As shown in FIG. 3, in step S21, the object detection unit 220 may analyze the distributed positions of the cluster points. In step S22, the object detection unit 220 may reset the reference boundary differently according to whether the points are distributed in a preset area or not.

For example, when the points are distributed in the preset area in step S22, the object detection unit 220 may change or reset the reference boundary in step S23 without further analyzing the distribution of the points like steps s24, s25, and s26.

Alternatively, when the points are not included in the preset area in step S22, the object detection unit 220 may set peak points among the analyzed points in step S24.

For example, the peak points may include a first peak point and a second peak point.

The first peak point may be a point disposed at the lowermost position in a vertical direction (or a longitudinal direction) among the analyzed points. The first peak point may be referred to as a minimum (Min) point, or (X1, Y1) coordinates of the Min point.

The second peak point may be a point disposed at the uppermost position in the vertical direction (or the longitudinal direction) among the analyzed points. The second peak point may be referred to as a maximum (Max) point, or (X2, Y2) coordinates of the Max point.

In step S25, the object detection unit 220 may derive a reference line connecting the set peak points. For example, the object detection unit 220 may derive the reference line connecting the set first peak point and the set second peak point. That is, one end portion of the reference line may be the first peak point, and the other end portion of the reference line may be the second peak point.

In step S26, the object detection unit 220 may determine the number of the analyzed points based on the derived reference line. For example, the object detection unit 220 may determine the number of points disposed on the left side with respect to the derived reference line or the number of points disposed on the right side with respect to the derived reference line. In the present example, the points disposed on the left side may be referred to as left points, and the points disposed on the right side may be referred to as right points.

In step S27, the object detection unit 220 may reset the reference boundary based on the determined number of points. For example, when the number of the right points is greater than the number of the left points, the object detection unit 220 may change or reset the reference boundary based on the right points. In contrast, when the number of the left points is greater than the number of the right points, the object detection unit 220 may change or reset the reference boundary based on the left points. This will be further described below.

In step S30, the object detection unit 220 may detect a contour of the object by connecting the cluster points based on the reset reference boundary obtained by resetting as described above. The object detection unit 220 may generate the contour by connecting the cluster points whose search order has been changed according to resetting the reference boundary, and may generate and output a box according to a shape of the object based on the generated contour.

Object tracking may be performed to track the object based on the box of the detected object in step S40, and object classification may be performed to classify and output a type of the tracked object into a vehicle, a two-wheeled vehicle, a pedestrian, or the like in step S50.

Figure 4:
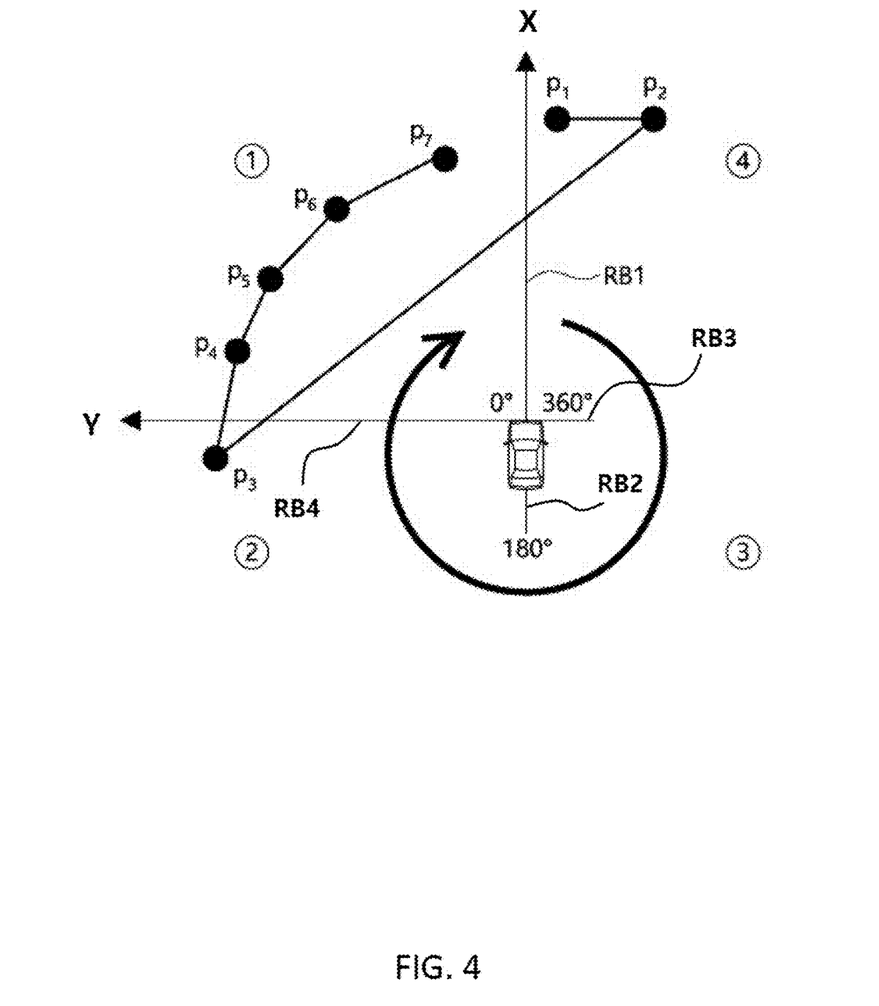
FIG. 4 and FIG. 5 are diagrams illustrating examples of a reference boundary of global quadrants.
Figure 5:
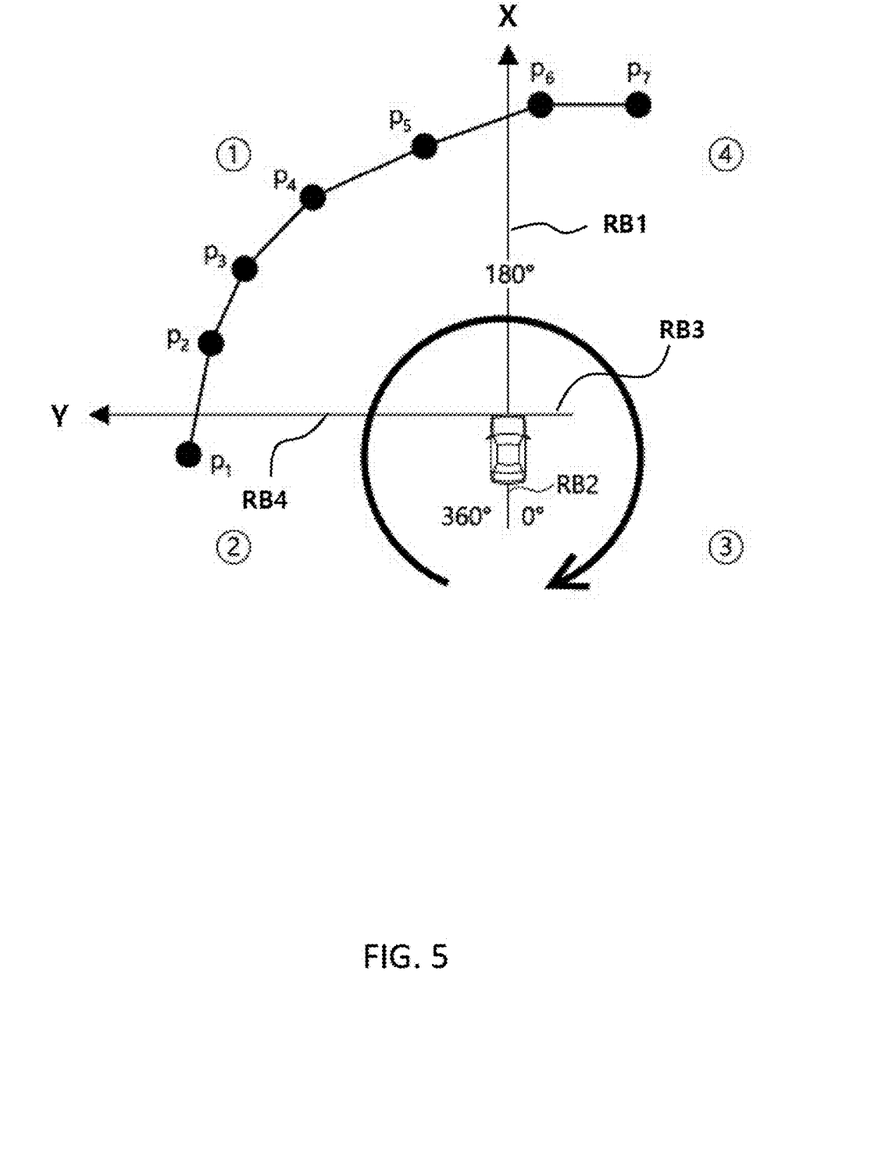

FIG. 4 and FIG. 5 are diagrams illustrating examples of a reference boundary of global quadrants.

Referring to FIG. 4 and FIG. 5, the global quadrants may be set so that its origin point is located at a center portion of a front bumper of the vehicle. The global quadrants may include a plurality of quadrants. The quadrants may include, for example, a first quadrant (indicated as ①), a second quadrant (②), a third quadrant (③), and a fourth quadrant (④).

The first quadrant ① may be disposed in an upper left area with respect to the vehicle. The first quadrant ① may correspond to an area in the range of 0° to 90° in counter-clockwise (CCW) direction with respect to a vertical direction X. The vertical direction X may also be referred to as a longitudinal direction or X direction thereof.

The second quadrant ② may be disposed in a lower left area with respect to the vehicle. The second quadrant ② may correspond to an area in the range of 90° to 180° in the CCW direction thereof. In FIG. 4, Y may indicate a lateral direction with respect to the vehicle.

The third quadrant ③ may be disposed in a lower right area with respect to the vehicle. The third quadrant ③ may be an area in the range of 180° to 270° in the CCW direction thereof.

The fourth quadrant ④ may be disposed in an upper right area with respect to the vehicle. The fourth quadrant ④ may be an area in the range of 270° to 360° in the CCW direction thereof.

One of four boundaries of the global quadrants may be set as the reference boundary for determining the search order of points to obtain or generate a contour. For example, the global quadrants may include a first boundary RB1, a second boundary RB2, a third boundary RB3, and a fourth boundary RB4. As shown in FIG. 4, the first boundary may be defined as a boundary between the first quadrant ① and the fourth quadrant ④, the second boundary between the second quadrant ② and the third quadrant ③, the third boundary between the third quadrant ③ and the fourth quadrant ④, and the fourth boundary between the first quadrant and the second quadrant ②.

As shown in FIG. 4, the first boundary RB1 may be set as the reference boundary, and thus, to obtain or generate a contour, the object tracking device 200 may perform sorting the points in the search order of a CW direction from the first boundary RB1. For example, the object tracking device 200 may perform the sorting or indexing (for describing convenience, referred to as only 'sorting') in the CW direction starting from the fourth quadrant ④, and via the third quadrant ③ and the second quadrant ②, and to the first quadrant ①. Accordingly, the object tracking device 200 may sequentially search for the points, starting from P1 disposed in the fourth quadrant ④ to P2, P3 disposed in the second quadrant ②, and P4 to P7 disposed in the first quadrant ①.

FIG. 5 shows an exemplary embodiment where the reference boundary in FIG. 4 has been reset to be the second boundary RB2. As shown in FIG. 5, the second boundary RB2 may be a boundary which is at 180° with respect to the vehicle and is between the second quadrant ② and the third quadrant ③. In the instant case, to obtain or generate the contour, the object tracking device 200 may perform sorting the points in the search order of a CW direction from the second boundary RB2. In the instant case, the object tracking device 200 may perform the sorting in a sequential order of the second quadrant ②, the first quadrant ①, the fourth quadrant ④, and the third quadrant ③. Accordingly, in the instant case, the object tracking device 200 may sequentially search for the points, starting from P1 disposed in the second quadrant ② to P2 to P5 disposed in the first quadrant ①, and P6 and P7 disposed in the fourth quadrant ④.

In an assuming situation where the reference boundary is set to be the third boundary RB3, to obtain or generate a contour, the object tracking device 200 may perform sorting the points in the search order of a CW direction from the third boundary RB3. In the instant case, the object tracking device 200 may perform the sorting in the CW direction in a sequential order of the third quadrant ③, the second quadrant ②, the first quadrant ①, and the fourth quadrant ④.

Also, in another assuming situation where the reference boundary is set to the fourth boundary RB4, to obtain or generate a contour, the object tracking device 200 may perform sorting the points in a CW direction in the search order from the fourth boundary RB4. In the instant case, the object tracking device 200 may perform the sorting in the CW direction in a sequential order of the first quadrant ①, the fourth quadrant ④, the third quadrant ③, and the second quadrant ②.

In the present disclosure as described above, when setting the search order to obtain a contour (or outline) of an object, the object tracking device 200 may consider a distribution of points, i.e., a rough shape of the object and reset the reference boundary for the search order. As shown in FIG. 4 and FIG. 5, the reference boundary is reset from the first boundary RB1 to the second boundary RB2, a more accurate shape of the object is obtained. Accordingly, it helps to match the LiDAR data to a map and reduce an error in the matching.

Figure 6:
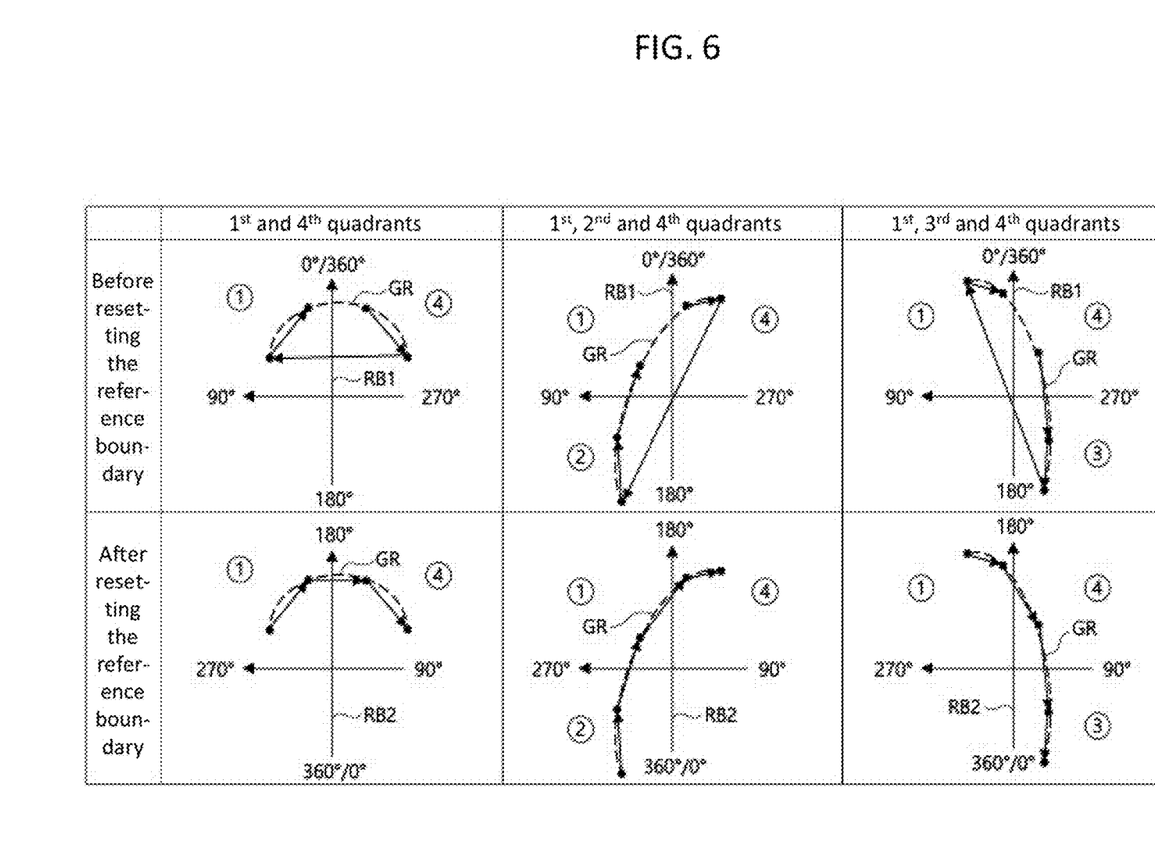
FIG. 6 is a diagram illustrating an example of an object outline extraction result obtained when points are distributed in a preset area according to an exemplary embodiment of the present disclosure.

FIG. 6 is a diagram illustrating an example of an object outline extraction result obtained when points are distributed in a preset area according to an exemplary embodiment of the present disclosure.

Referring to FIG. 6, the object tracking device 200 may analyze distributed positions of cluster points, and reset a reference boundary for the search order to one of the first boundary RB1, the second boundary RB2, the third boundary RB3, and the fourth boundary RB4 based on whether the points are distributed in a preset area.

When the points are distributed in the preset area, the object tracking device 200 may reset the reference boundary from the first boundary RB1 of the global quadrants to the second boundary RB2.

That is, when the distributed positions of the points are included in the preset area, the object tracking device 200 may reset or redefine an angle with respect to the reference boundary. For example, the angle with respect to the reference boundary may be redefined as follows. To the present end, the object tracking device 200 may reset or redefine the angles of the points by Equation 1. That is, the initial angles of points located in the range of 0° to 180° before the resetting of the reference boundary are redefined by being added by 180°, and the initial angles of points located in the range of 180° to 360° before the resetting of the reference boundary are redefined by being subtracted by 180°.

$$0 \leq \text{Angle} < 180 \rightarrow +180,\ 180 \leq \text{Angle} < 360 \rightarrow -180 \quad \text{[Equation 1]}$$

In the instant case, the preset area may include both the first quadrant ① and the fourth quadrant ④. For example, the preset area may include the first quadrant ① and the fourth quadrant ④; the preset area may include the first quadrant ①, the second quadrant ②, and the fourth quadrant ④; or the preset area may include the first quadrant ①, the third quadrant ③, and the fourth quadrant ④.

The first quadrant ① may also be referred to as quadrant 1, the second quadrant ② may also be referred to as quadrant 2, the third quadrant ③ may also be referred to as quadrant 3, and the fourth quadrant ④ may also be referred to as quadrant 4.

For example, to obtain or generate an object contour in a state in which the second boundary RB2 is reset as the reference boundary from the first boundary RB1, the object tracking device 200 may perform sorting in a search order of a CW direction from the second boundary RB2. In the present example, the object tracking device 200 may perform the sorting in the CW direction in a sequential order of the second quadrant ②, the first quadrant ①, the fourth quadrant ④, and the third quadrant ③. Accordingly, the object tracking device 200 may remove relatively unnecessarily continuous segments, and may thereby output a result of extracting an outline that fits well to a shape of an object which is of an actual guardrail (GR) shape.

FIG. 7, FIG. 8, FIG. 9 and FIG. 10 are diagrams illustrating examples of an object outline extraction result obtained when points are not distributed in the preset area according to an exemplary embodiment of the present disclosure.

The object tracking device 200 may analyze distributed positions of cluster points and reset the reference boundary to one of the first reference boundary RB1, the second reference boundary RB2, the third reference boundary RB3, and the fourth reference boundary (RB4) based on whether a result value obtained from the analysis is distributed in a preset area.

Figure 7:
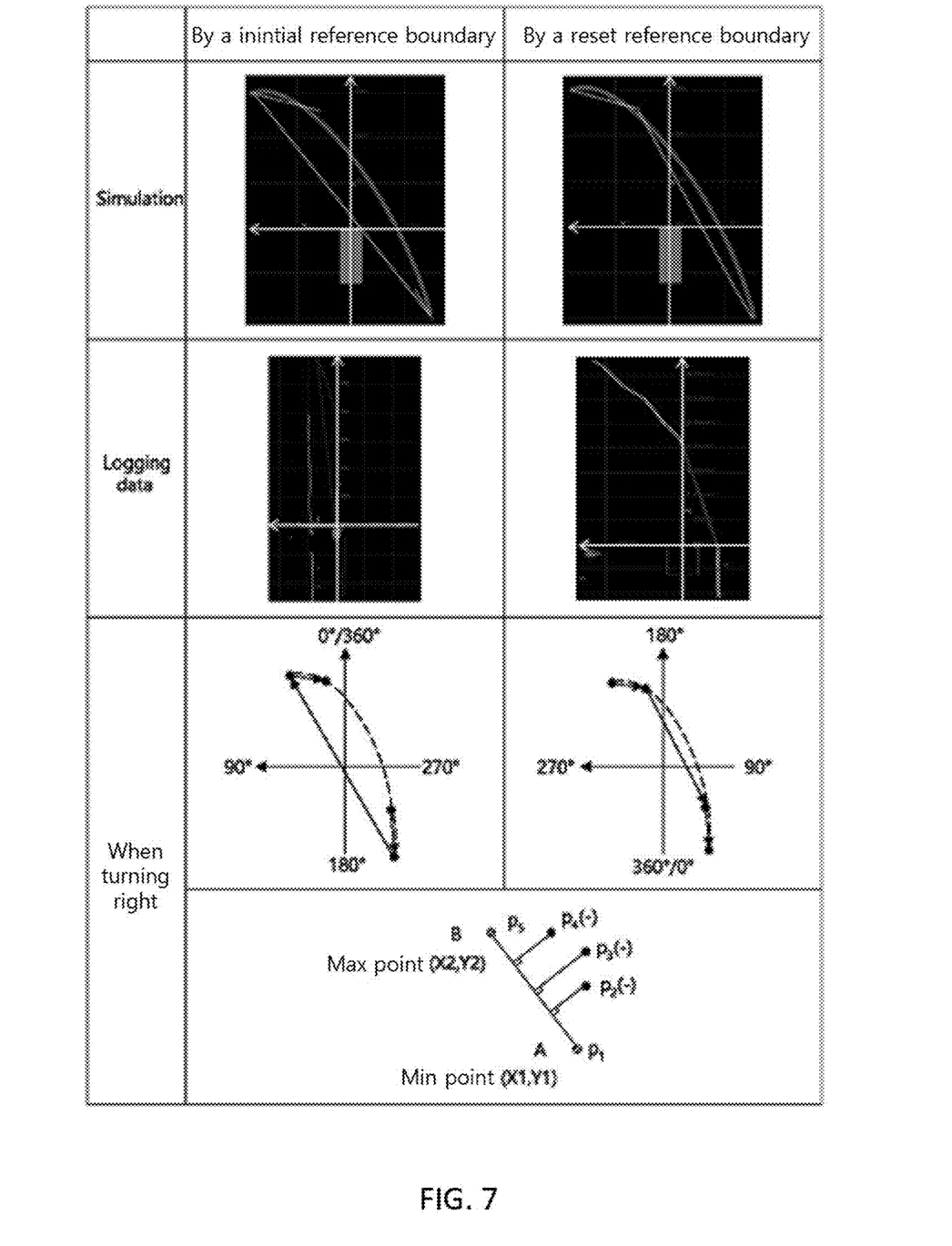
FIG. 7, FIG. 8, FIG. 9 and FIG. 10 are diagrams illustrating examples of an object outline extraction result obtained when points are not distributed in a preset area according to an exemplary embodiment of the present disclosure.

In the example of FIG. 7, the following description will be provided under the assumption that the distributed positions of the points are included in the first quadrant ① and the third quadrant ③ which does not correspond to the preset area.

In a case in which result values are not distributed in the preset area but are distributed only in the first quadrant ① and the third quadrant ③, the object tracking device 200 may set a first peak point A and a second peak point B among the analyzed points.

The first peak point A may be a point disposed at the lowermost position in a vertical direction (or a longitudinal direction) among the analyzed points. The first peak point A may be referred to as a Min point or (X1, Y1) coordinates of the Min point.

The second peak point B may be a point disposed at the uppermost position in the vertical direction (or the longitudinal direction) among the analyzed points. The second peak point B may be referred to as a Max point or (X2, Y2) coordinates of the Max point.

The object tracking device 200 may derive a reference line (or an AB segment) that connects the set first peak point A and the set second peak point B.

The object tracking device 200 may determine the number of the analyzed points based on the derived reference line. For example, when the number of points disposed on the right side with respect to the derived reference line (the AB segment) is greater as shown in FIG. 7, the object tracking device 200 may determine that an object (e.g., a guardrail) is located on the right side thereof. In the present example, the object tracking device 200 may reset the reference boundary to one of the first boundary RB1, the second boundary RB2, the third boundary RB3, and the fourth boundary RB4 based on the right points.

When the distributed positions of the points are not included in the preset area but are in the first quadrant and the ① and the third quadrant ③ as described above, the object tracking device 200 may reset or redefine an angle with respect to the reference boundary. For example, the object tracking device 200 may reset or redefine the angle by Equation 2 as follows.

$$0 \leq \text{Angle} < 180 \rightarrow +180,\ 180 \leq \text{Angle} < 360 \rightarrow -180 \quad \text{[Equation 2]}$$

For example, to obtain or generate an object contour in a state in which the second boundary RB2 is reset as the reference boundary from the first boundary RB1, the object tracking device 200 may perform sorting the points in the search order of a CW direction from the second boundary RB2. For example, the object tracking device 200 may perform the sorting in the CW direction in a sequential order from the second quadrant ② to the first quadrant ①, the fourth quadrant ④, and the third quadrant ③. Accordingly, the object tracking device 200 may remove relatively unnecessarily continuous segments, and may thereby output a result of extracting an outline which is substantially the same as a shape of the object which is of an actual guardrail (GR) shape.

Figure 8:
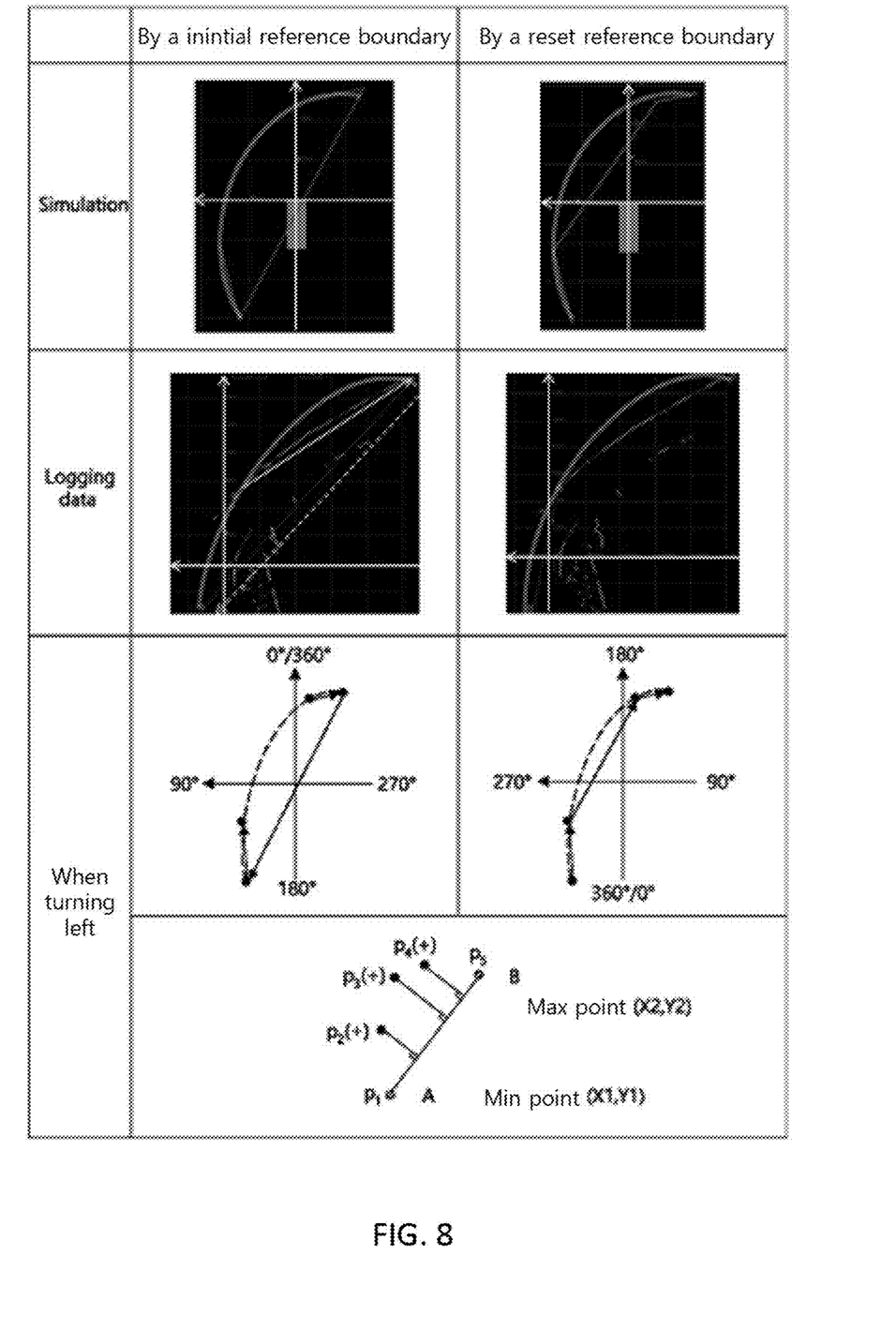

In the example FIG. 8, the following description will be provided under the assumption that the distributed positions of the points are not included in the preset area but are included in the second quadrant ② and the fourth quadrant ④.

In a case in which the result values are not distributed in the preset area but are distributed only in the second quadrant ② and the fourth quadrant ④, the object tracking device 200 may set a first peak point A and a second peak point B among the analyzed points.

The object tracking device 200 may derive a reference line (or an AB segment) that connects the set first peak point A and the set second peak point B.

The object tracking device 200 may determine the number of the analyzed points based on the derived reference line. For example, when the number of points disposed on the left side with respect to the derived reference line (the AB segment) is greater as shown in FIG. 8, the object tracking device 200 may determine that an object (e.g., a guardrail) is located on the left side thereof. In the present example, the object tracking device 200 may reset the reference boundary to one of the first boundary RB1, the second boundary RB2, the third boundary RB3, and the fourth boundary RB4 based on the left points.

When the distributed positions of the points are not included in the preset area but are in the second quadrant ② and the fourth quadrant ④ as described above, the object tracking device 200 may reset or redefine an angle with respect to the reference boundary. For example, the object tracking device 200 may reset or redefine the angle by Equation 3 as follows.

$$0 \leq \text{Angle} < 180 \rightarrow +180,\ 180 \leq \text{Angle} < 360 \rightarrow -180 \quad \text{[Equation 3]}$$

For example, to obtain or generate an object contour in a state in which the second boundary RB2 is reset as the reference boundary from the first boundary RB1, the object tracking device 200 may perform sorting the points in the search order of a CW direction from the second boundary RB2. For example, the object tracking device 200 may perform the sorting in the CW direction in a sequential order from the second quadrant ② to the first quadrant ①, the fourth quadrant ④, and the third quadrant ③. Accordingly, the object tracking device 200 may remove relatively unnecessarily continuous segments, and may thereby output a result of extracting an outline which is substantially the same as a shape of the object which is of an actual guardrail (GR) shape.

Figure 9:
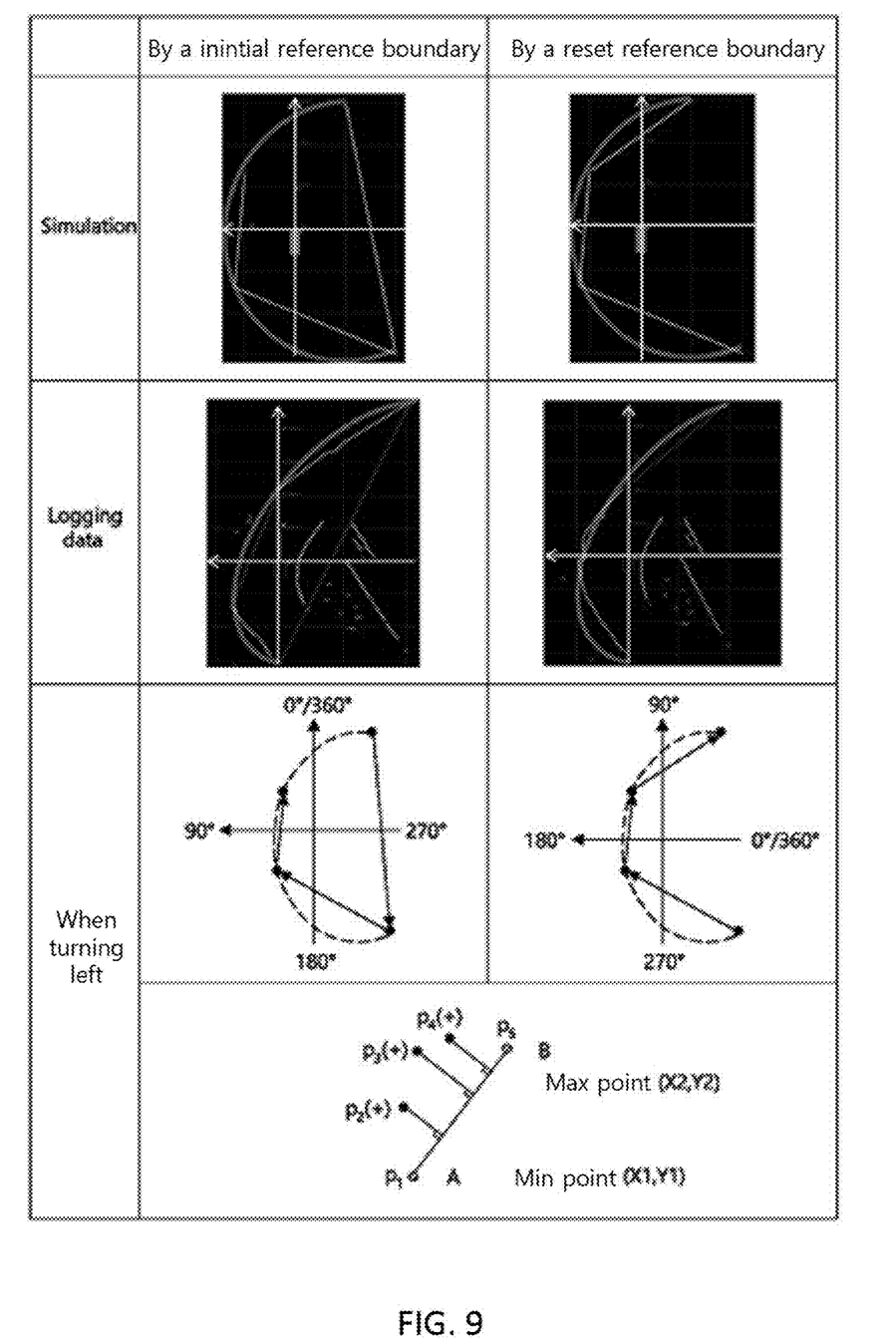

In the example FIG. 9, the following description will be provided under the assumption that the distributed positions of the points are not included in the preset area but are in all the quadrants.

In a case in which the result values are not distributed in the preset area but are distributed in all the quadrants, the object tracking device 200 may set a first peak point A and a second peak point B among the analyzed points.

The object tracking device 200 may derive a reference line (or an AB segment) that connects the set first peak point A and the set second peak point B.

The object tracking device 200 may determine the number of the analyzed points based on the derived reference line. For example, when the number of points disposed on the left side with respect to the derived reference line (the AB segment) is greater as shown in FIG. 9, the object tracking device 200 may determine that an object (e.g., a guardrail) is located on the left side thereof. In the present example, the object tracking device 200 may reset the reference boundary to one of the first boundary RB1, the second boundary RB2, the third boundary RB3, and the fourth boundary RB4 based on the left points.

When the distributed positions of the points are not included in the preset area but are in all the quadrants as described above, the object tracking device 200 may reset or redefine an angle with respect to the reference boundary. For example, the object tracking device 200 may reset or redefine the angle by Equation 4 as follows.

$$0 \leq \text{Angle} < 270 \rightarrow +90,\ 270 \leq \text{Angle} < 360 \rightarrow -270 \quad \text{[Equation 4]}$$

For example, to obtain or generate an object contour in a state in which the third boundary RB3 is reset as the reference boundary from the first boundary RB1, the object tracking device 200 may perform sorting the points in the search order of a CW direction from the third reference boundary RB3. For example, the object tracking device 200 may perform the sorting in the CW direction in a sequential order from the third quadrant ③ to the second quadrant ②, the first quadrant ①, and the fourth quadrant ④. Accordingly, the object tracking device 200 may remove relatively unnecessarily continuous segments, and may thereby output a result of extracting an outline which is substantially the same as a shape of the object which is of an actual guardrail (GR) shape.

Figure 10:
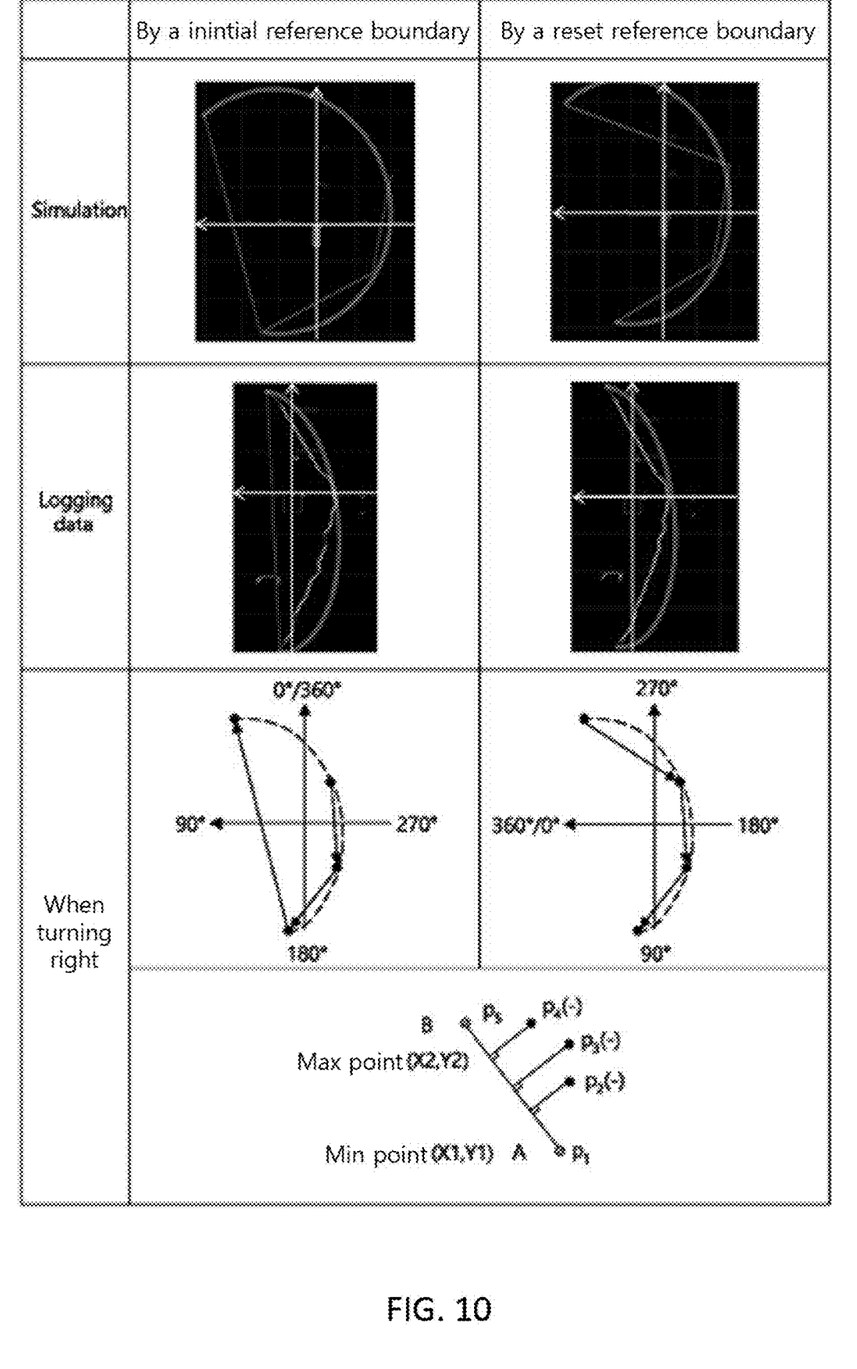

In the example FIG. 10, the following description will be provided under the assumption that the distributed positions of the points are not included in the preset area but are in all the quadrants.

The object tracking device 200 may determine the number of the analyzed points based on the derived reference line. For example, when the number of points disposed on the right side with respect to the derived reference line (the AB segment) is greater as shown in FIG. 10, the object tracking device 200 may determine that an object (e.g., a guardrail) is located on the right side thereof. In the present example, the object tracking device 200 may reset the reference boundary to one of the first boundary RB1, the second boundary RB2, the third boundary RB3, and the fourth boundary RB4 based on the right points.

When the distributed positions of the points are not included in the preset area but are in all the quadrants as described above, the object tracking device 200 may reset or redefine an angle with respect to the reference boundary. For example, the object tracking device 200 may reset or redefine the angle by Equation 5 as follows.

$$0 \leq \text{Angle} < 90 \rightarrow +270,\ 90 \leq \text{Angle} < 360 \rightarrow -90 \quad \text{[Equation 5]}$$

For example, to obtain or generate an object contour in a state in which the fourth boundary RB4 is reset as the reference boundary from the first boundary RB1, the object tracking device 200 may perform sorting the points in the search order of a CW direction from the fourth boundary RB4. For example, the object tracking device 200 may perform the sorting in the CW direction angle in a sequential order from the first quadrant ① to the fourth quadrant ④, the third quadrant ③, and the second quadrant ②. Accordingly, the object tracking device 200 may remove relatively unnecessarily continuous segments, and may thereby output a result of extracting an outline that is substantially the same as a shape of the object which is of an actual guardrail (GR) shape.

As described above, according to various exemplary embodiments of the present disclosure, it may be verified that a result of extracting an object outline which is substantially the same as an actual object shape may be output, compared to a result obtained from a typical technique according to the related art.

The present disclosure described above may be embodied as computer-readable code on a medium in which a program is recorded. The computer-readable medium includes all types of recording devices in which data readable by a computer system is stored.

Examples of the computer-readable medium include a Hard Disk Drive (HDD), a solid-state drive (SSD), a silicon disk drive (SDD), a read-only memory (ROM), a random-access memory (RAM), a CD-ROM, a magnetic tape, a floppy disk, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An object outline extracting method which is executed by a processor in a vehicle, the method comprising:
   detecting distributed positions of points in global quadrants generated based on a location of the vehicle, the points obtained from light detection and ranging (LiDAR) data of an object of interest, the global quadrants including a reference boundary for a search order;
   analyzing the distributed positions of the points, and determining whether the points are distributed in a preset area of the global quadrants;
   when the processor concludes that the points are distributed in the preset area, resetting the reference boundary to obtain a reset reference boundary; and
   generating an object contour of the object by connecting the points in the search order based on the reset reference boundary and generating a track; and
   controlling the vehicle based on the generated track and the generated object contour.

2. The object outline extracting method of claim 1, further including:
   receiving the LiDAR data from a LiDAR sensor; and
   generating a cluster point based on preprocessing and clustering performed on the LiDAR data.

3. The object outline extracting method of claim 1, further including:
   when the processor concludes that the points are not distributed in the preset area, setting a first peak point and a second peak point among the points; and
   deriving a reference line connecting the first peak point and the second peak point.

4. The object outline extracting method of claim 3, further including:
   determining a number of left points disposed on a left side from the reference line and a number of right points disposed on a right side from the reference line.

5. The object outline extracting method of claim 4, further including:
   when the number of the left points is greater than the number of the right points, resetting the reference boundary based on the left points to obtain the reset reference boundary.

6. The object outline extracting method of claim 4, further including:
   when the number of the right points is greater than the number of the left points, resetting the reference boundary based on the right points to obtain the reset reference boundary.

7. The object outline extracting method of claim 3,
   wherein the first peak point is a point disposed at a lowermost position based on a vertical direction among the points, and
   wherein the second peak point is a point disposed at an uppermost position based on the vertical direction among the points.

8. The object outline extracting method of claim 1,
   wherein the global quadrants include:
   a first quadrant disposed in an upper left area with respect to the vehicle;
   a second quadrant disposed in a lower left area with respect to the vehicle;
   a third quadrant disposed in a lower right area with respect to the vehicle; and
   a fourth quadrant disposed in an upper right area with respect to the vehicle, and
   wherein the preset area includes at least one area of:
   the first quadrant and the fourth quadrant;
   the first quadrant, the second quadrant, and the fourth quadrant; or
   the first quadrant, the third quadrant, and the fourth quadrant.

9. The object outline extracting method of claim 8,
   wherein the global quadrants includes:
   a first boundary which is a boundary between the first quadrant and the fourth quadrant;
   a second boundary which is a boundary between the second quadrant and the third quadrant;
   a third boundary which is a boundary between the third quadrant and the fourth quadrant; and
   a fourth boundary which is a boundary between the first quadrant and the second quadrant, and
   wherein the first boundary is set as the reference boundary.

10. The object outline extracting method of claim 9, wherein, when the processor concludes that the points are distributed in the preset area, the resetting of the reference boundary includes setting the second boundary as the reference boundary and obtaining the reset reference boundary.

11. The object outline extracting method of claim 9, further including:
when the processor concludes that the points are not distributed in the preset area, resetting the reference boundary as one of the first boundary, the second boundary, the third boundary, and the fourth boundary to obtain the reset reference boundary.

12. A vehicle, comprising:
a light detection and ranging (LiDAR) sensor; and
an object tracking device configured to receive LiDAR data from the LiDAR sensor, the object tracking device including at least one processor,
wherein the object tracking device is configured to:
detect distributed positions of points in global quadrants generated based on a location of the vehicle, the points obtained from the LiDAR data of an object of interest, the global quadrants including a reference boundary for a search order;
analyze the distributed positions of the points, and determine whether the points are distributed in a preset area of the global quadrants;
when the at least one processor concludes that the points are distributed in the preset area, resetting the reference boundary to obtain a reset reference boundary; and
generate an object contour of the object by connecting the points in the search order based on the reset reference boundary and generating a track; and
control the vehicle based on the generated track and the generated object contour.

13. The vehicle of claim 12, wherein the object tracking device is configured to:
when the at least one processor concludes that the points are not distributed in the preset area, set a first peak point and a second peak point among the points; and
derive a reference line connecting the set first peak point and the set second peak point.

14. The vehicle of claim 13, wherein the object tracking device is configured to:
determine a number of left points disposed on a left side from the reference line and a number of right points disposed on a right side from the reference line.

15. The vehicle of claim 14, wherein the object tracking device is configured to:
when the number of the left points is greater than the number of the right points, resetting the reference boundary based on the left points to obtain the reset reference boundary; or
when the number of the right points is greater than the number of the left points, resetting the reference boundary based on the right points to obtain the reset reference boundary.

16. The vehicle of claim 13,
wherein the first peak point is a point disposed at a lowermost position based on a longitudinal direction among the points, and
wherein the second peak point is a point disposed at an uppermost position based on the longitudinal direction among the points.

17. The vehicle of claim 13,
wherein the global quadrants include:
a first quadrant disposed in an upper left area with respect to the vehicle;
a second quadrant disposed in a lower left area with respect to the vehicle;
a third quadrant disposed in a lower right area with respect to the vehicle; and
a fourth quadrant disposed in an upper right area with respect to the vehicle,
wherein the preset area includes at least one area of:
the first quadrant and the fourth quadrant;
the first quadrant, the second quadrant, and the fourth quadrant; or
the first quadrant, the third quadrant, and the fourth quadrant.

18. The vehicle of claim 17,
wherein the global quadrants includes:
a first boundary which is a boundary between the first quadrant and the fourth quadrant;
a second boundary which is a boundary between the second quadrant and the third quadrant;
a third boundary which is a boundary between the third quadrant and the fourth quadrant; and
a fourth boundary which is a boundary between the first quadrant and the second quadrant, and
wherein the first boundary is set as the reference boundary.

19. The vehicle of claim 18, wherein, when the at least one processor concludes that the points are distributed in the preset area, the resetting of the reference boundary includes setting the second boundary as the reference boundary and obtaining the reset reference boundary.

20. The vehicle of claim 18, wherein the object tracking device is further configured to:
when the at least one processor concludes that the points are not distributed in the preset area, reset the reference boundary as one of the first boundary, the second boundary, the third boundary, and the fourth boundary to obtain the reset reference boundary.

* * * * *